(No Model.)
W. A. ROBINSON.
GRAIN SEPARATOR FOR THRASHING MACHINES.
No. 274,386. Patented Mar. 20, 1883.
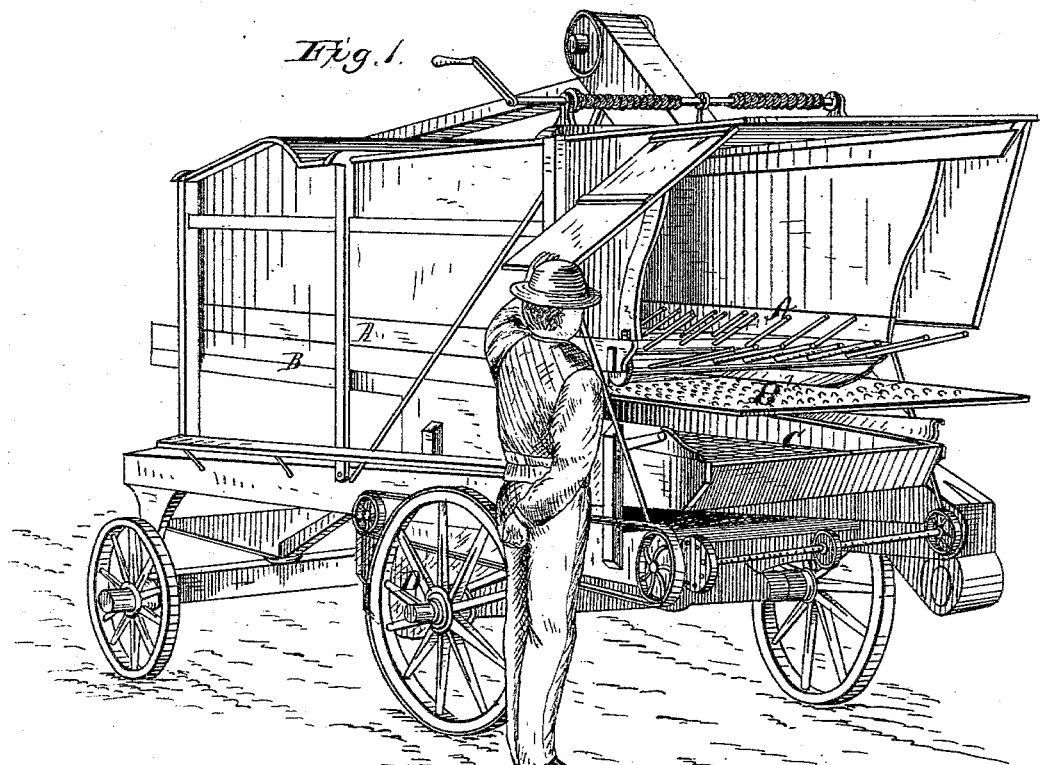
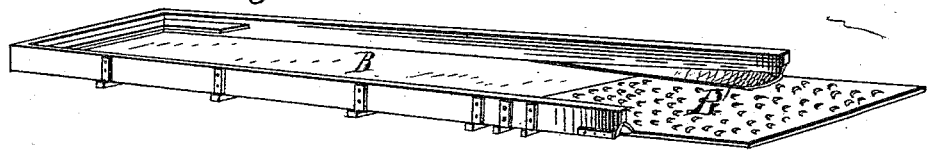
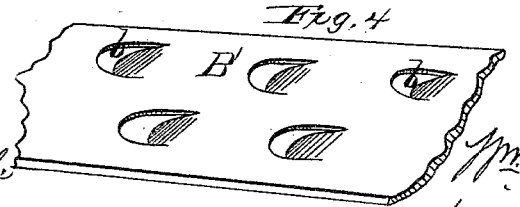
Witnesses.
Inventor.
Wm. A. Robinson
by A. M. Smith & Co.
Attorneys

UNITED STATES PATENT OFFICE.

WILLIAM A. ROBINSON, OF NANKIN, ASSIGNOR TO NICHOLS, SHEPARD & COMPANY, OF BATTLE CREEK, MICHIGAN.

GRAIN-SEPARATOR FOR THRASHING-MACHINES.

SPECIFICATION forming part of Letters Patent No. 274,386, dated March 20, 1883.

Application filed August 18, 1881. (No model.)

*To all whom it may concern:*

Be it known that I, WILLIAM A. ROBINSON, of Nankin, county of Wayne, State of Michigan, have invented new and useful Improvements in Grain-Separators for Thrashing-Machines, of which the following is a full, clear, and exact description, reference being had to the accompanying drawings, making part of this specification, in which—

Figure 1 is a perspective view of a grain thrasher and separator complete with my improvement applied. Fig. 2 is a similar view of the pan or lower shaker detached, showing my improvement. Fig. 3 represents a vertical longitudinal section through a portion of the outer end of the pan or lower shaker, and Fig. 4 is a perspective view of a portion of the same.

My invention consists, first, in the combination, with the lower shaking-screen, of a tail extension or pan provided with inclined converging sides; and it further consists in the combination, with the tail extension constructed as described, of the flooring having horseshoe-shaped perforations provided each with an inclined return-chute, as hereinafter explained.

In the accompanying drawings, A represents the upper shaker or straw-carrier, which receives the straw and grain from the thrashing-cylinder, and which may be of any usual or preferred construction, that shown being provided with the usual flooring formed with slots having openings between them, or with other suitable openings, permitting the passage of the grain, chaff, and smaller particles through it, while carrying the straw outward to its discharge end, and with the usual lifting-fingers for agitating and opening up the straw and effecting the release of the grain. Directly underneath this straw-carrier or upper shaker is arranged what is usually termed the lower "shaker" or "pan," B, lying in a plane parallel, or thereabout, with the straw-carrying shaker, and serving by being connected therewith in such manner as to move in an opposite direction—that is, to move forward when the upper shaker moves backward, and vice versa—to counterbalance the latter and relieve the machine of the heavy jar and strain which would otherwise be produced. This lower shaker or pan is made shallow, and is usually provided with a close flooring or bottom adapted to receive the grain, chaff, &c., from the straw-carrier, and to carry it outward to its discharge end, overhanging a screen, C, upon which the grain falls, the grain and chaff during such fall being exposed to a blast of air from a fan at D, designed to blow the chaff and lighter particles out over the upper end of the screen, while permitting the grain and heavier particles of foreign matter to fall thereon.

I propose, in lieu of the above construction, to extend the flooring of this lower shaker or pan at its discharge end some twenty-three inches, (more or less,) in such manner as to carry the chaff over and beyond the screen, forming said extension B' of sheet metal having U or horseshoe shaped perforations or slits $b$ cut in it, the inclosed tongue $b'$ being bent downward, so as to incline backward toward the fan, forming small openings with return-chutes, permitting the escape of the grain and heavier particles of foreign matter, while at the same time the inclined tongues serve to catch a portion of the blast passing underneath the pan from the fan, and to force it up through said extension, thereby facilitating the removal of the lighter particles, chaff, &c., over the end of the extension and free or clear of the screen. These perforations should be arranged in transverse rows, those in one row being set opposite the spaces between the perforations in the preceding row, giving them a zigzag relation, so that any grain that may escape between the perforations of one row will be caught in and made to pass through the perforations of the succeeding row.

The sides of the extension may, if desired, be made to incline slightly inward, converging toward the discharge end, so as to gradually condense the material thereon toward the center, thereby facilitating the removal of the grain by causing a lateral movement from each side toward the center. By means of this extension of the lower shaker and its peculiar construction the grain and chaff are made to travel farther than by the usual construction and the separation is effected prior to the discharge of the chaff from the pan, instead of during the time of its fall from the end thereof, under the action of the fan-blast, though the arrangement may be such as to cause the latter action to assist in the separation of the chaff from the grain by allowing the screen to project slightly beyond the discharge end of the extension.

Having now described my invention, I claim—

1. The combination, with the lower shaker, of the tail extension or pan provided with the inclined converging sides, for the purpose and substantially as described.

2. In a grain-separator, the combination, with the separating-shaker, of the tail extension or pan provided with inclined converging sides and a flooring having horseshoe-shaped perforations provided each with an independent return-chute, all constructed, arranged, and operating substantially as described.

In testimony whereof I have hereunto set my hand this 13th day of August, A. D. 1881.

WILLIAM A. ROBINSON.

Witnesses:
HAMILTON BALUSS,
FREEDOM G. SHEPARD.